(12) United States Patent
Nesgaard

(10) Patent No.: US 10,502,029 B2
(45) Date of Patent: Dec. 10, 2019

(54) DOWNHOLE POWER SUPPLY DEVICE

(71) Applicant: Welltec Oilfield Solutions AG, Zug (CH)

(72) Inventor: Carsten Nesgaard, Allerød (DK)

(73) Assignee: WELLTEC OILFIELD SOLUTIONS AG, Zug (CH)

( * ) Notice: Subject to any disclaimer, the term of this patent is extended or adjusted under 35 U.S.C. 154(b) by 0 days.

(21) Appl. No.: 15/610,962

(22) Filed: Jun. 1, 2017

(65) Prior Publication Data
US 2017/0350216 A1    Dec. 7, 2017

(30) Foreign Application Priority Data

Jun. 2, 2016 (EP) ..................................... 16172602

(51) Int. Cl.
| | |
|---|---|
| *E21B 41/00* | (2006.01) |
| *E21B 47/06* | (2012.01) |
| *H01M 8/04119* | (2016.01) |
| *H01M 8/04082* | (2016.01) |
| *H01M 8/103* | (2016.01) |
| *H01M 8/18* | (2006.01) |
| *H01M 8/1018* | (2016.01) |

(Continued)

(52) U.S. Cl.
CPC ........ *E21B 41/0085* (2013.01); *E21B 47/065* (2013.01); *H01M 8/04171* (2013.01); *H01M 8/04201* (2013.01); *H01M 8/103* (2013.01); *H01M 8/186* (2013.01); *H01M 2008/1095* (2013.01); *H01M 2250/10* (2013.01); *Y02B 90/14* (2013.01)

(58) Field of Classification Search
CPC .............. E21B 41/0085; E21B 47/065; H01M 8/04171; H01M 8/103; H01M 8/186; H01M 2250/10
See application file for complete search history.

(56) References Cited

U.S. PATENT DOCUMENTS

| | | | | |
|---|---|---|---|---|
| 4,460,292 A | * | 7/1984 | Durham ................ | B09B 3/0033 175/66 |
| 4,662,608 A | * | 5/1987 | Ball ........................ | E21B 44/00 175/162 |
| 6,444,343 B1 | | 9/2002 | Prakash et al. | |

(Continued)

OTHER PUBLICATIONS

International Search Report and Written Opinion dated Jul. 19, 2017 in International Application No. PCT/EP2017/063390 (11 pages).

(Continued)

*Primary Examiner* — Taras P Bemko
*Assistant Examiner* — Manuel C Portocarrero
(74) *Attorney, Agent, or Firm* — Nixon & Vanderhye P.C.

(57) ABSTRACT

The present invention relates to a downhole power supply device for supplying power in situ to a power consuming device arranged in a well, comprising a fuel cell producing electricity and water and having a fuel inlet, an oxidising inlet, an electric output and a water outlet, a fuel container fluidly connected to the fuel inlet, and an oxidising agent container fluidly connected to the oxidising inlet, wherein the fuel cell has an internal pressure which is at least 1.0 bar for increasing a boiling temperature of the water produced in the fuel cell. Furthermore, the present invention relates to a downhole system.

20 Claims, 9 Drawing Sheets

Figure 1:
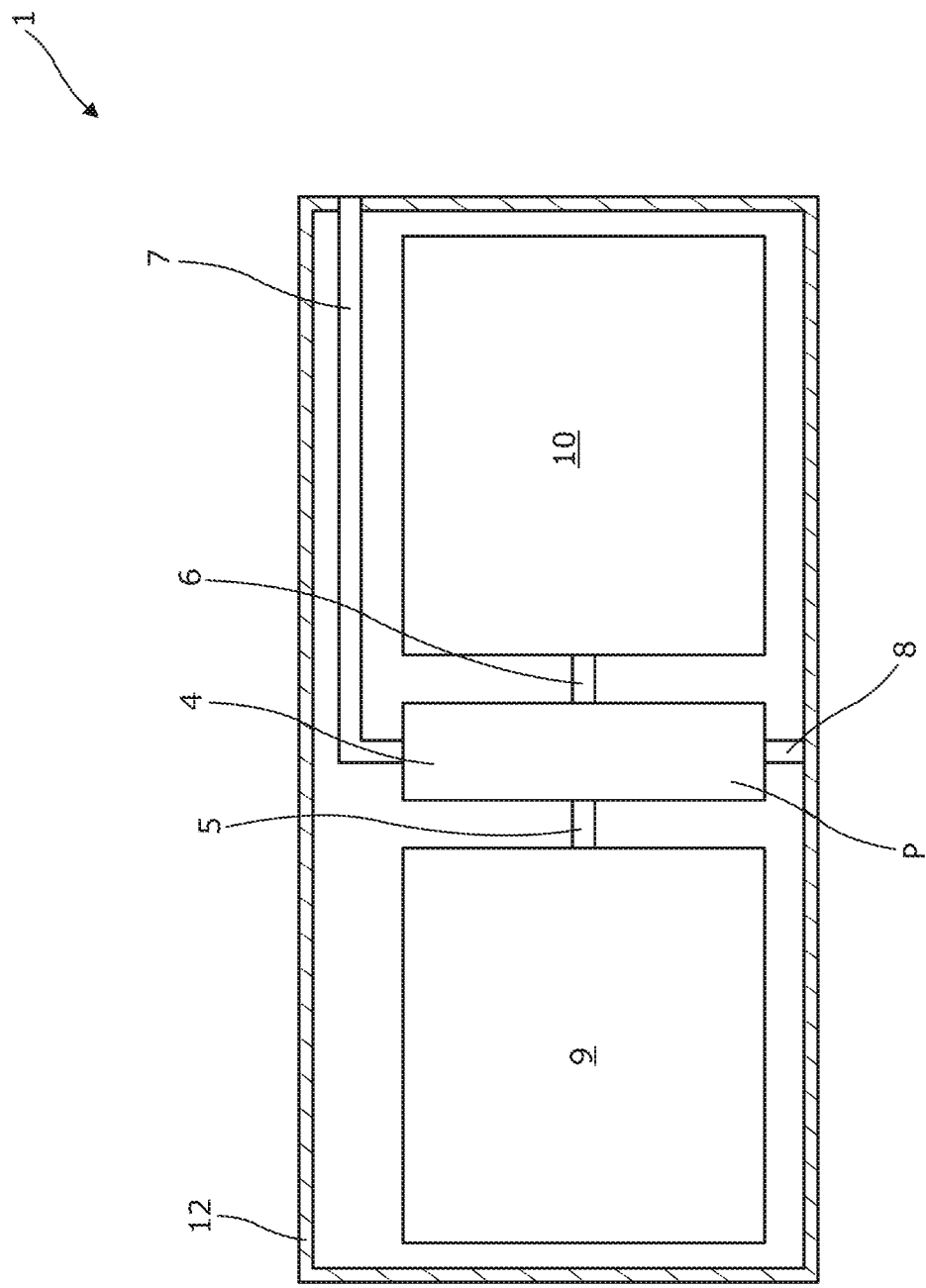

(51) Int. Cl.
*E21B 23/00* (2006.01)
*E21B 23/01* (2006.01)

(56) References Cited

U.S. PATENT DOCUMENTS

| | | | |
|---|---|---|---|
| 9,096,725 B2* | 8/2015 | Choi | C08G 61/12 |
| 9,312,557 B2 | 4/2016 | Zhang et al. | |
| 2002/0011335 A1* | 1/2002 | Zhang | E21B 41/0085 |
| | | | 166/335 |
| 2002/0034668 A1 | 3/2002 | Zhang et al. | |
| 2008/0128134 A1* | 6/2008 | Mudunuri | C10G 1/02 |
| | | | 166/302 |
| 2008/0247897 A1* | 10/2008 | Guthrie | F01C 1/3446 |
| | | | 418/229 |
| 2013/0294557 A1* | 11/2013 | Perkins | H05H 3/06 |
| | | | 376/115 |
| 2014/0367120 A1 | 12/2014 | Kruspe et al. | |
| 2015/0171444 A1 | 6/2015 | Tanaka | |

OTHER PUBLICATIONS

Extended Search Report for EP16172602.1 dated Nov. 10, 2016, 7 pages.

\* cited by examiner

DOWNHOLE POWER SUPPLY DEVICE

This application claims priority to EP Patent Application No. 16172602.1 filed Jun. 2, 2016, the entire content of which is hereby incorporated by reference.

The present invention relates to a downhole power supply device for supplying power in situ to a power consuming device arranged in a well. Furthermore, the present invention relates to a downhole system.

When performing operations downhole with intervention tools, the demand for power for performing an operation is not always in compliance with the amount of power which can be delivered downhole. Lack of power, e.g. through a wireline, is especially the problem when an operation is performed 10-15 kilometres away from the wireline drum at the rig or at surface. Furthermore, wirelines are not always present at the top of the well. Thus, powering of power consuming devices arranged out of reach from a known supply of power supplied from the top of the well has become a field of increased focus in the area of oil field operations.

It is an object of the present invention to wholly or partly overcome the above disadvantages and drawbacks of the prior art. More specifically, it is an object to provide an improved downhole power supply for supplying power to a power consuming device arranged out of reach from a known supply of power supplied from the top of the well.

The above objects, together with numerous other objects, advantages and features, which will become evident from the below description, are accomplished by a solution in accordance with the present invention by a downhole power supply device for supplying power in situ to a power consuming device arranged in a well, comprising:
- a fuel cell producing electricity and water and having a fuel inlet, an oxidising inlet, an electric output and a water outlet,
- a fuel container fluidly connected to the fuel inlet, and
- an oxidising agent container fluidly connected to the oxidising inlet, wherein the fuel cell has an internal pressure which is at least 1.0 bar for increasing a boiling temperature of the water produced in the fuel cell.

Also, the fuel cell may be a polybenzimidazole fuel cell.

Moreover, the fuel cell may have a membrane comprising phosphoric acid (PA)-doped polybenzimidazole (PBI).

When having a membrane comprising phosphoric acid (PA)-doped polybenzimidazole (PBI), the polymer electrolyte membrane exhibits high ionic conductivity at temperatures above 150° C., low gas permeability, excellent oxidative and thermal stability, and nearly zero water drag coefficient.

Furthermore, the fuel cell may have a membrane of phosphoric acid (PA)-doped polybenzimidazole (PBI) film.

Further, the fuel cell may have a membrane, such as a high-temperature polymer electrolyte membrane.

Additionally, the high-temperature polymer electrolyte membrane may operate at a temperature above 150° C.

The fuel cell may be operable without external power for a period of time of more 500 hours, preferably more than 750 hours and even more preferably more than 1000 hours.

Also, the membrane may be prepared by either imbibing the polybenzimidazole (PBI) membranes cast from dimethyl acetamide (DMAc) organic solvent with phosphoric acid (PA) or casting directly from a solution of polybenzimidazole (PBI) dissolved in a mixed acid solvent such as trifluoroacetic acid (TFA) and phosphoric acid (PA).

In addition, the fuel cell may operate without humidification.

Furthermore, operation of polymer membrane fuel cells at temperatures higher than 120° C. without any external humidification is highly desired since fuel cell systems operating at higher temperature may be simplified dramatically.

Moreover, above 150° C., the power output at ambient pressure may reach more than 0.8 W/cm$^2$ at a current density above 1.4 A/cm$^2$.

Also, the fuel cell may be without gas humidification.

Further, the fuel cell may be a non-flow-through fuel cell.

Moreover, by having a non-flow-through fuel cell, the downhole power supply device can have a very simple design and the downhole power supply device is very reliable while providing a passive limit of maximum power delivered by the fuel cell. Thus, there is no need to control the fuel cell by having a maximum power limit. Furthermore by having a non-flow-through fuel cell, there may be no need for a pump in order to make the system operate.

In addition, the fuel cell may have an internal pressure which is at least 1.5 bar, preferably at least 3 bar, more preferably at least 5 bar, for increasing a boiling temperature of the water produced in the fuel cell.

The downhole power supply device may have a device housing comprising the fuel cell, the fuel container and the oxidising agent container.

Moreover, the device housing may have an internal pressure of at least 1.0 bar, preferably at least 1.5 bar, more preferably at least 3 bar, and even more preferably at least 5 bar.

Also, the device housing may be configured to withstand an external pressure of at least 50 bar.

Further, the water outlet may be fluidly connected to a water collecting container.

Additionally, the water outlet may be fluidly connected to the water collecting container by means of a capillarity member, such as a wick.

Furthermore, by having a capillarity member, the downhole power supply device may be rotation-independent.

The capillarity member may comprise a plurality of thin tubes, porous material, or similar materials and/or geometrical shapes for creating a capillarity effect.

Moreover, the water collecting container may comprise a water absorbing material.

Also, the water absorbing material may comprise Silicon dioxide or similar materials.

Furthermore, the water collecting container may be arranged in the device housing.

In addition, the water collecting container may be the device housing.

The downhole power supply device as described above may further comprise a control unit for controlling the supply of fuel and/or controlling the supply of an oxidising agent to the fuel cell.

The downhole power supply as described above may further comprise a power coupling, such as an electric connection, an electric transducer, an inductive coil or an acoustic transducer for receiving power.

Also, the downhole power supply may further comprise a wireline or a wet connector, such as a wet stab connector for receiving power The downhole power supply as described above may further comprise a regenerative unit being an electrolysis unit having an electrolysis chamber.

In addition, the power coupling may be connected to an electrolysis unit for supplying the received power to the electrolysis unit.

The downhole power supply as described above may further comprise a control unit, such as a timer for activating the fuel cell at certain time intervals.

Further, the electric output may be connected to the power consuming device.

Moreover, the downhole power supply device as described above may further comprise a regenerative unit comprising:
- a regenerative fuel cell for converting water from the fuel cell into fuel and into an oxidising agent,
- a first inlet fluidly connected with the water collecting container,
- a first outlet fluidly connected with the fuel container, and
- a second outlet fluidly connected with the oxidising agent container.

The downhole power supply device as described above may further comprise a temperature sensor for measuring a temperature exterior of the downhole power supply device and/or interior of the downhole power supply device.

Also, the downhole power supply device as described above may further comprise a pressure generating unit configured to increase the internal pressure.

Such increase of the internal pressure may be based on a temperature measurement.

Moreover, the fuel container may comprise a plurality of metal hydrates for binding the fuel.

The present invention also relates to a downhole system comprising:
- a well tubular metal structure arranged in a borehole and having an exterior face and an inside,
- a power consuming device, and
- a downhole power supply device according to any of the preceding claims, arranged inside the well tubular metal structure or arranged on the exterior face of the well tubular metal structure.

Furthermore, the power consuming device may be a tool arranged in the well tubular metal structure and the downhole power supply device may be comprised in the tool.

The tool may be wireless.

Also, the tool may be connected to a slickline.

Further, the tool may be connected to an optic fibre for communicating data to a surface of the borehole.

Moreover, the tool may be a downhole driving unit, such as a downhole tractor.

In addition, the downhole power supply device may be a secondary power supply to the tool.

The power consuming device may be a sensor or an actuator, being arranged exterior of the well tubular metal structure, e.g. on the exterior face of the well tubular metal structure.

Furthermore, the downhole power supply device and the power consuming device may be arranged exterior of the well tubular metal structure, e.g. on the exterior face of the well tubular metal structure.

Also, the well tubular metal structure may comprise an annular barrier comprising:
- a tubular metal part for mounting as part of the well tubular metal structure, the tubular metal part having a first expansion opening and an outer face,
- an expandable metal sleeve surrounding the tubular metal part and having an inner face facing the tubular metal part and an outer face facing a wall of the borehole, each end of the expandable metal sleeve being connected with the tubular metal part, and
- an annular space between the inner face of the expandable metal sleeve and the tubular metal part, the expandable metal sleeve being configured to expand by entering pressurised fluid into the annular space through the first expansion opening.

Further, the well tubular metal structure may comprise a plurality of annular barriers.

Finally, the downhole power supply device and the power consuming device may be arranged between two adjacent annular barriers.

Figure 2:
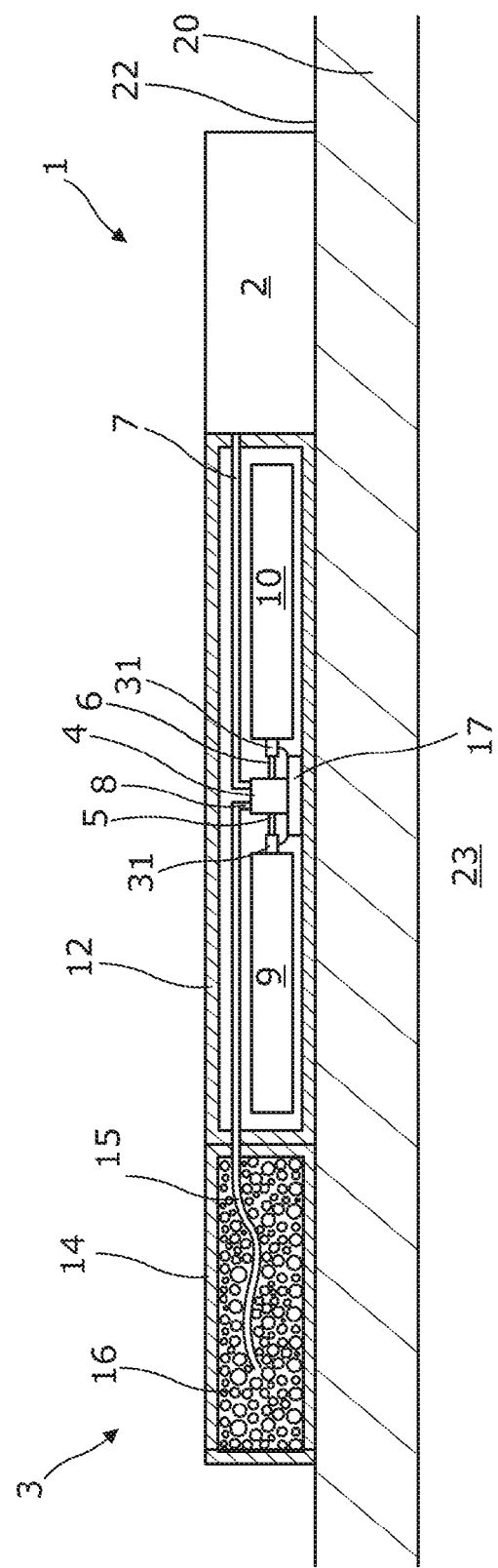
Figure 3:
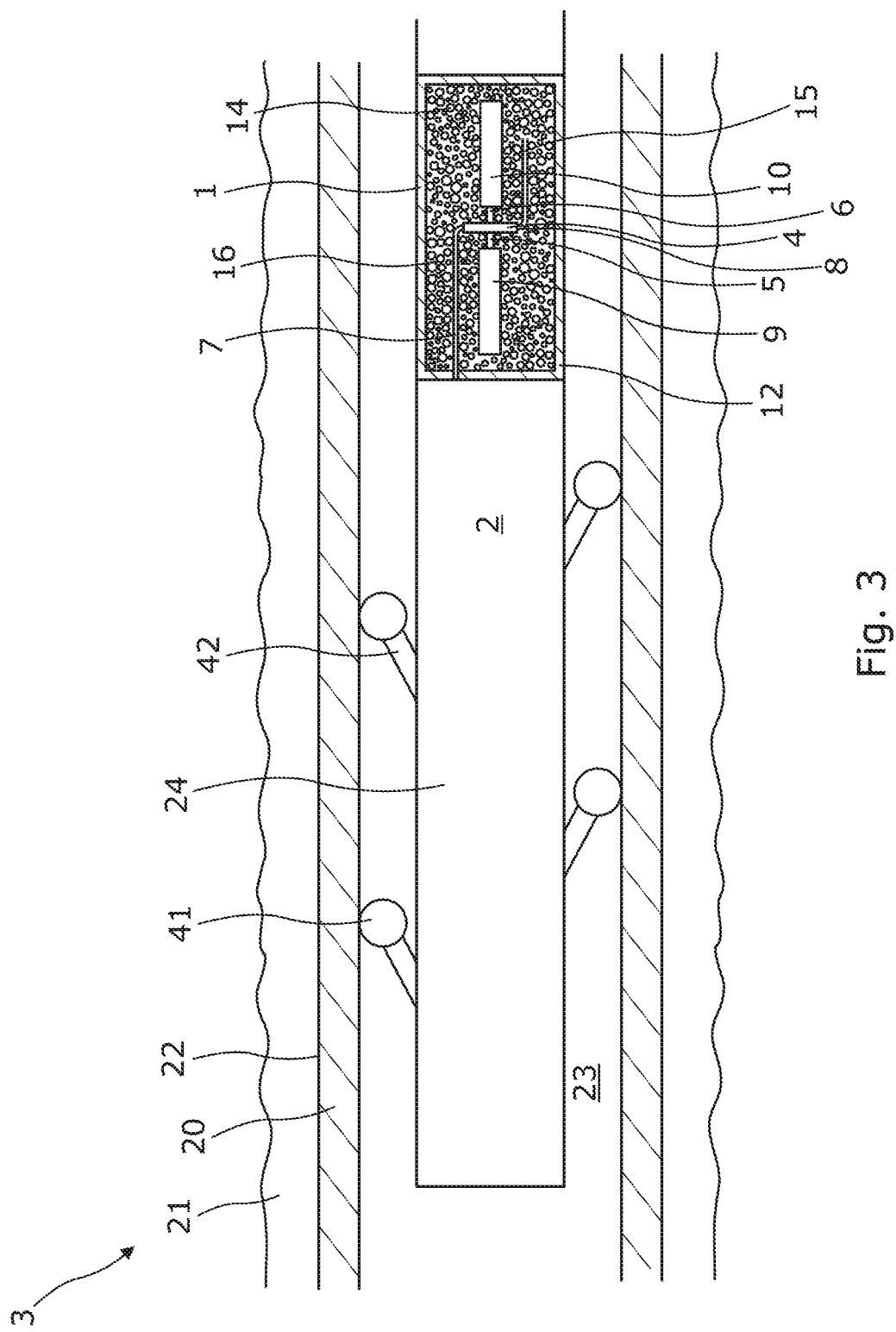
Figure 4:
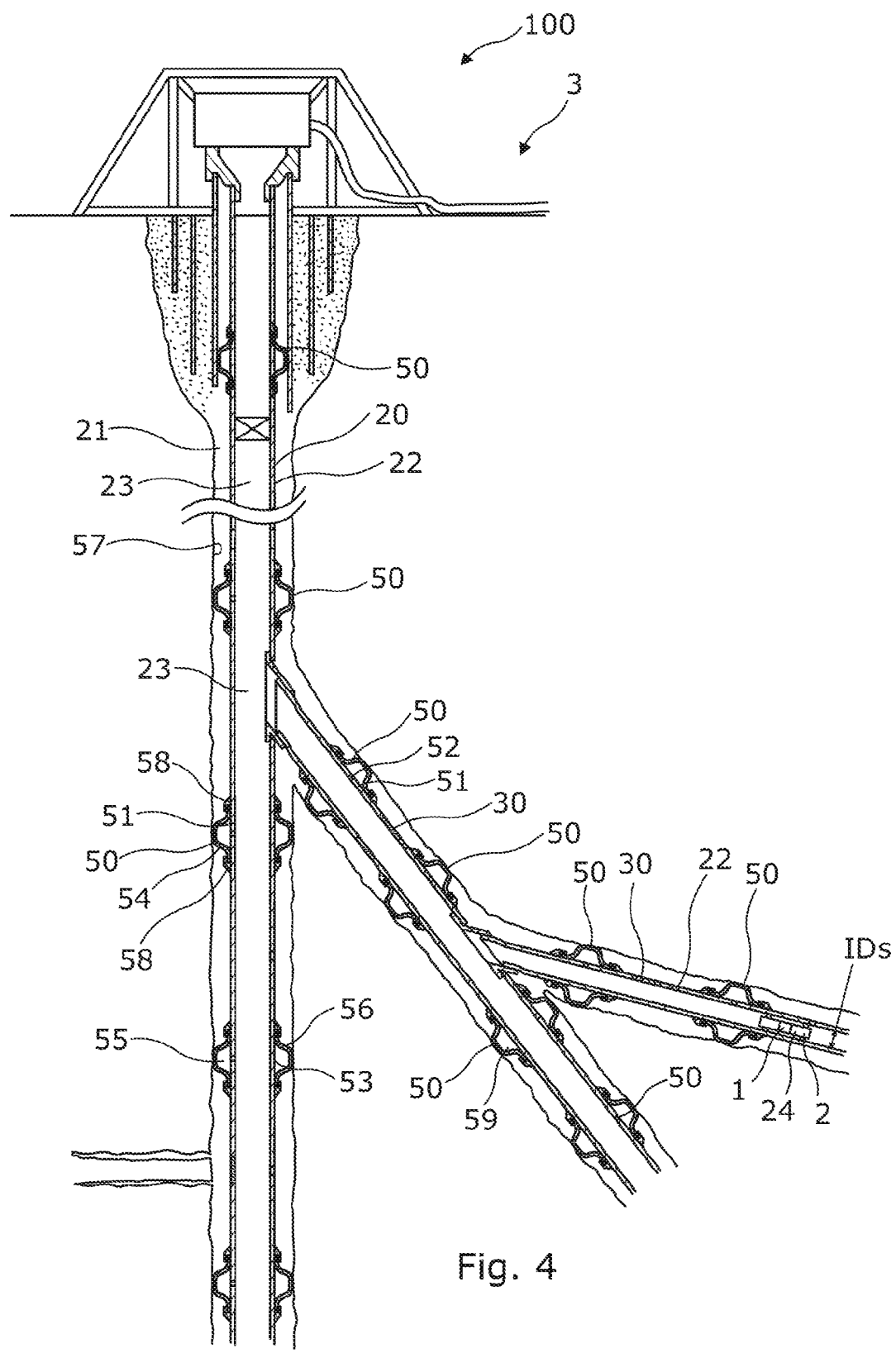
Figure 5:
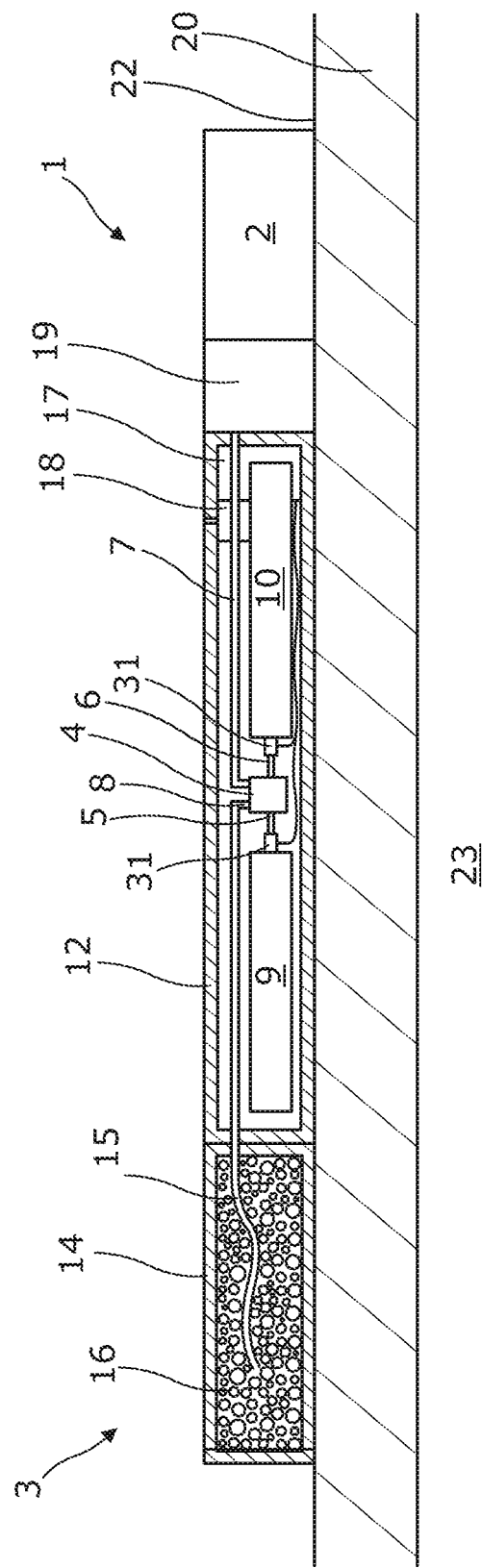
Figure 6:
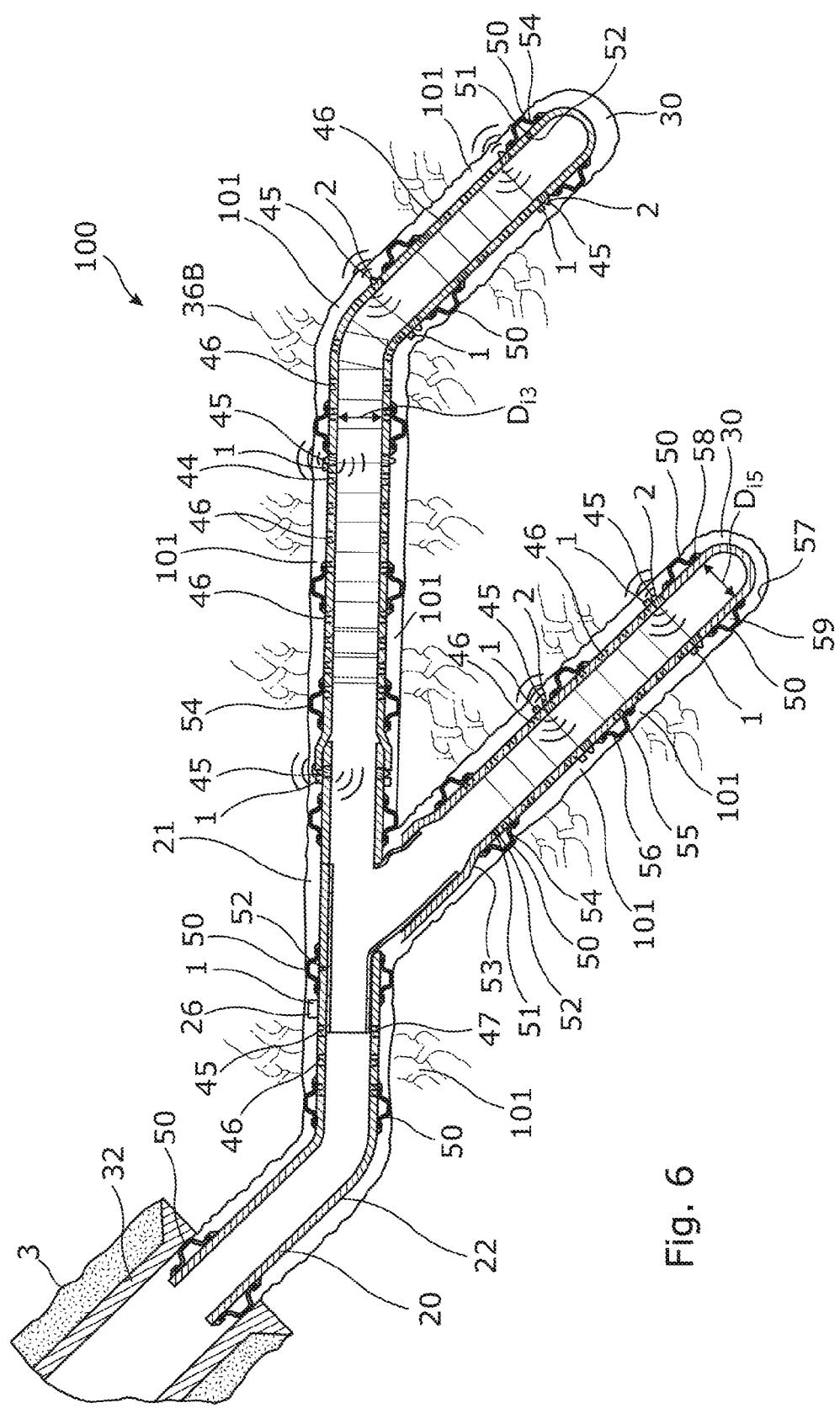
Figure 7:
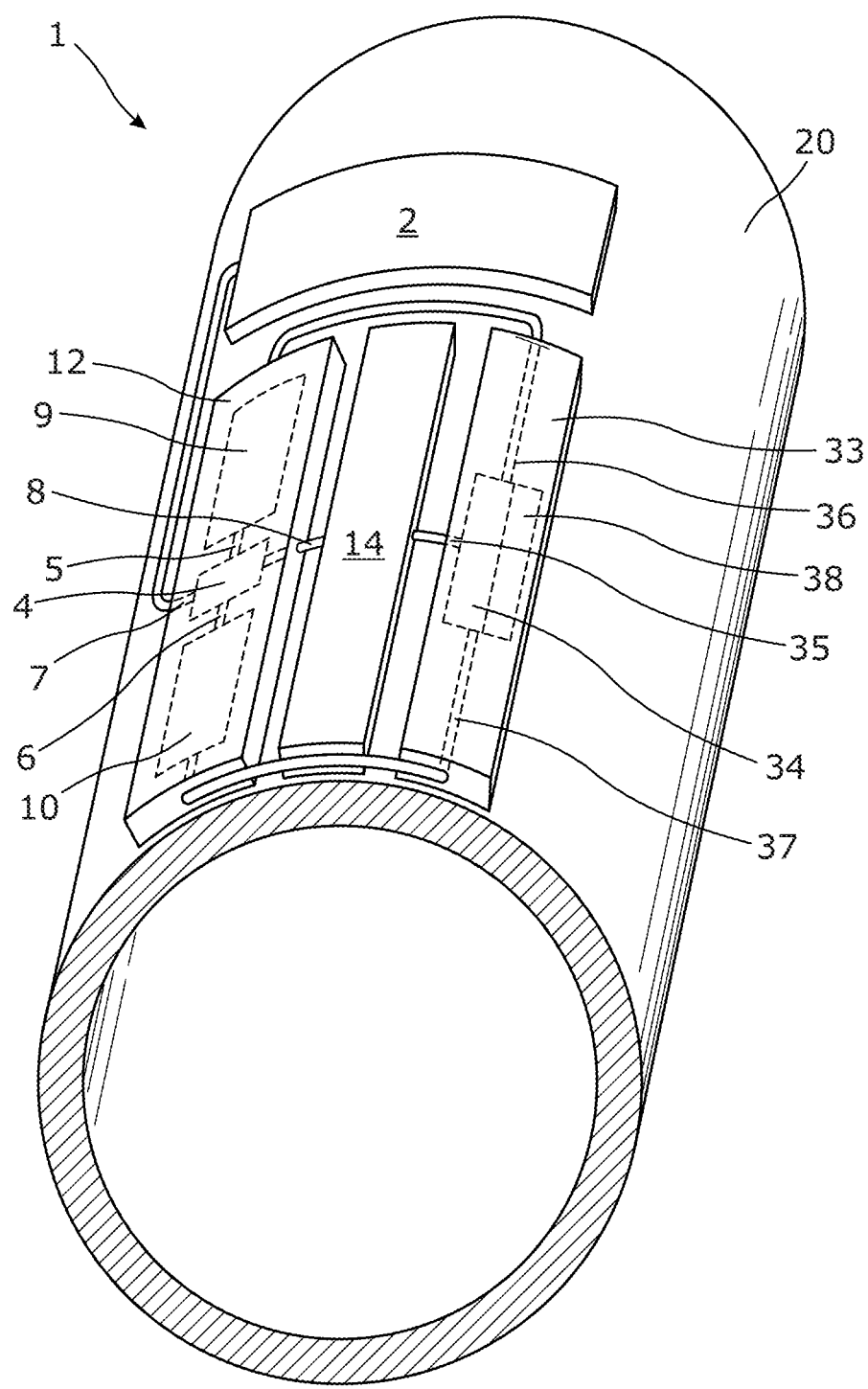
Figure 8:
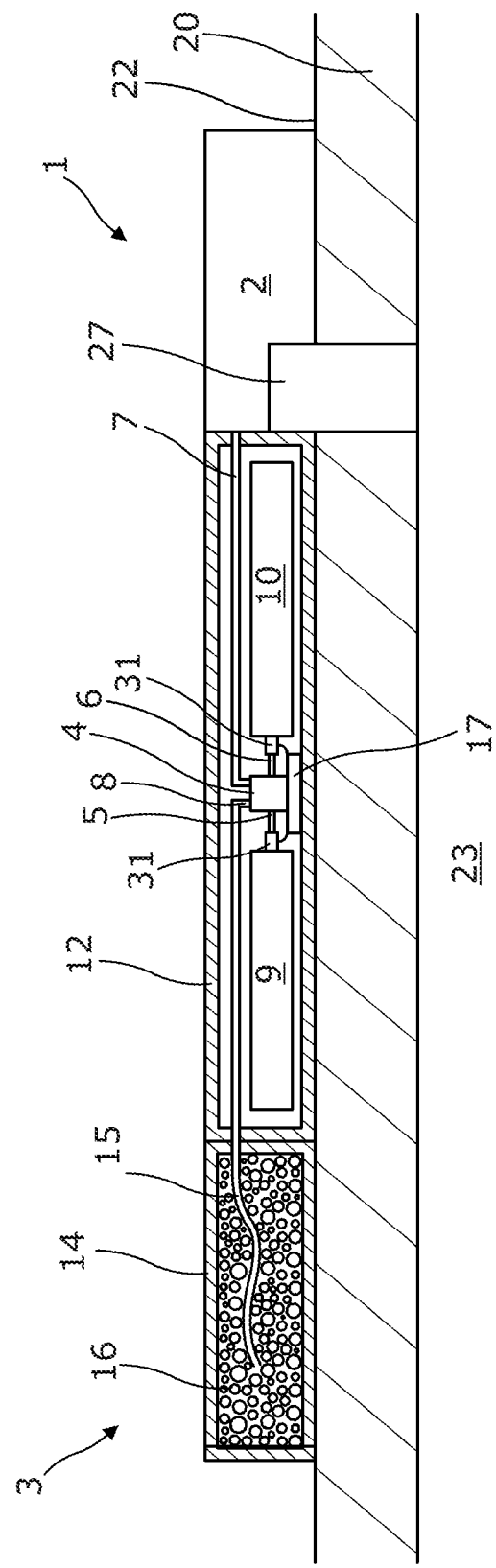
Figure 9:
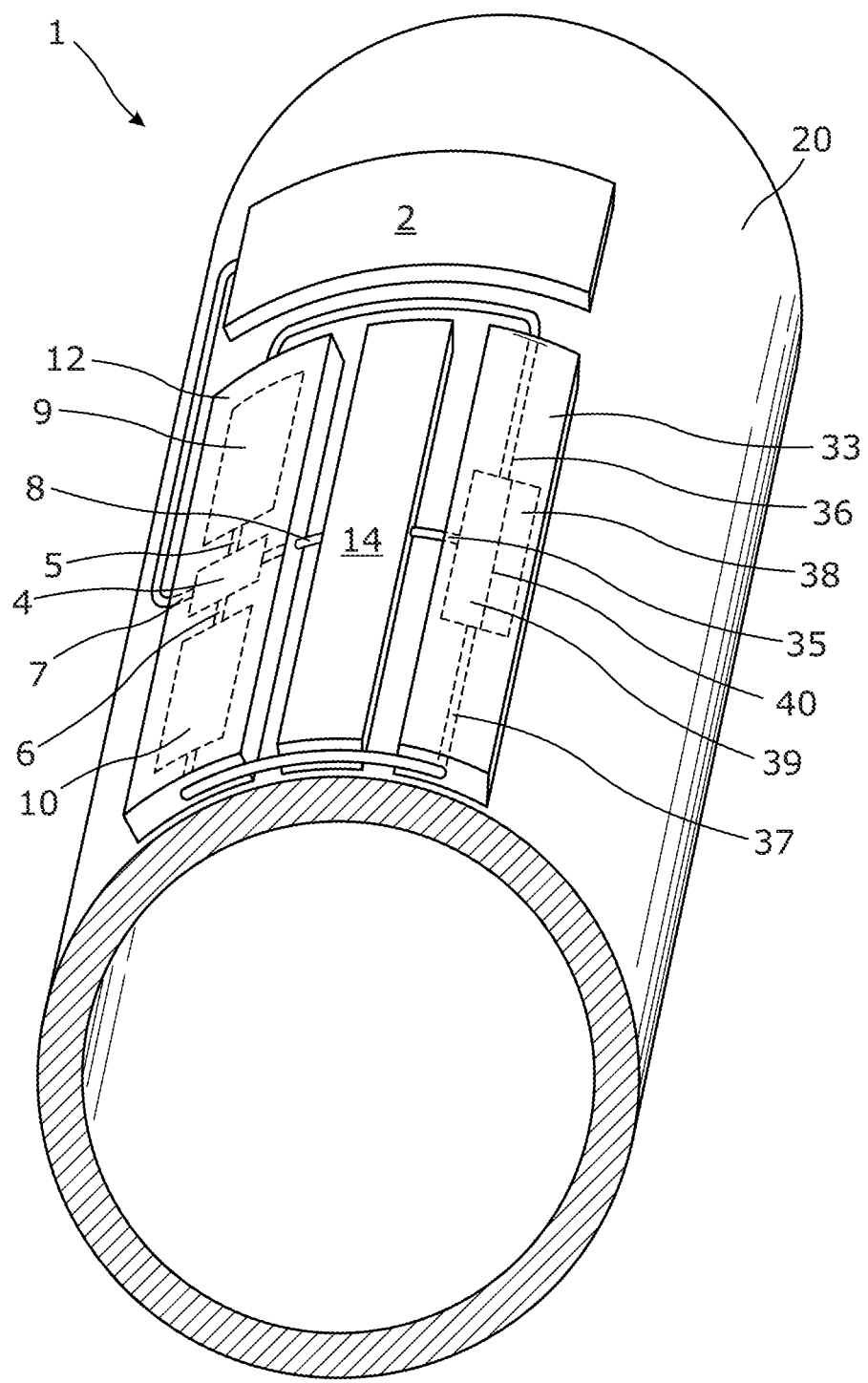

The invention and its many advantages will be described in more detail below with reference to the accompanying schematic drawings, which for the purpose of illustration show some non-limiting embodiments and in which FIG. 1 shows a partial cross-sectional view of a downhole power supply device for supplying power in situ in a well, FIG. 2 shows a partial cross-sectional view of another downhole power supply device arranged outside of a well tubular metal structure, FIG. 3 shows a partial cross-sectional view of another downhole power supply device arranged inside of a well tubular metal structure, FIG. 4 shows a partial cross-sectional view of a downhole system in which the downhole power supply device is arranged inside of a well tubular metal structure, FIG. 5 shows a partial cross-sectional view of another downhole power supply device arranged outside of a well tubular metal structure, FIG. 6 shows a partial cross-sectional view of a downhole system in which the downhole power supply device is arranged outside of a well tubular metal structure, FIG. 7 shows a partial cross-sectional view of another downhole power supply device arranged outside of a well tubular metal structure, FIG. 8 shows a partial cross-sectional view of another downhole system in which the downhole power supply device is arranged outside of a well tubular metal structure, and FIG. 9 shows a partial cross-sectional view of yet another downhole power supply device arranged outside of a well tubular metal structure.

All the figures are highly schematic and not necessarily to scale, and they show only those parts which are necessary in order to elucidate the invention, other parts being omitted or merely suggested.

FIG. 1 shows a downhole power supply device 1 for supplying power in situ to a power consuming device arranged in a borehole of a well so that the power consuming device does not rely on power by other means, such as through a wireline or through electrical lines on the outside of a well tubular metal structure in the borehole. The power consuming device can thus be arranged very far away from the top of the well where power through the wireline is very limited or not possible, or it can be arranged outside the well tubular metal structure away from the reach of electrical lines where the power consuming device cannot receive power.

The downhole power supply device 1 comprises a fuel cell 4 producing electricity, heat and water. The downhole power supply device 1 has a fuel inlet 5, an oxidising inlet 6, an electric output 7 and a water outlet 8. Fuel is fed from a fuel container 9 fluidly connected to the fuel inlet, and an oxidising agent is fed to the fuel cell from an oxidising agent container 10 fluidly connected to the oxidising inlet 6. The fuel cell has an internal pressure P which is at least 1.0 bar for increasing a boiling temperature of the water produced in the fuel cell in order to prevent the water from transforming into its gas phase.

The downhole power supply device 1 has a device housing 12 comprising the fuel cell, the fuel container 9 and the oxidising agent container 10, which has an internal pressure P of at least 1.0 bar. The internal pressure of at least 1.5 bar, preferably at least 3 bar, of the device housing 12 may be provided at surface before the downhole power supply device 1 is submerged into the well.

Thus, in order to withstand an external pressure of at least 50 bar, the device housing is provided with a significant wall thickness and is made of a material having a high yield strength. The device housing 12 may be made of aluminium in order to efficiently transport heat generated in the housing away from the housing.

In FIG. 2, the downhole power supply device 1 is arranged on the exterior face 22 of the well tubular metal structure 20 in order to power a power consuming device 2 which is electrically connected to the electric output 7. The downhole power supply device 1 comprises a water collecting container 14 and the water outlet 8 is fluidly connected to the water collecting container 14. The water outlet is fluidly connected to the water collecting container by means of a capillarity member 15, such as a wick. The capillarity member 15 thus sucks the water from the fuel cell into the water collecting container 14 by means of its capillary effect, and the ability of the water to be led away from the fuel cell does not rely on the gravity force, which is the case for known fuel cells. When a tool or a well tubular metal structure is submerged into a well, the orientation is not always known, and when entering a non-vertical part of the well, the fuel cell in such tool or outside the well tubular metal structure cannot rely on gravity in order to guide the water from the fuel cell. Thus by providing the downhole power supply device 1 with the capillarity member 15, it is ensured that the water is always led from the fuel cell, so the process in the fuel cell is not deteriorated. The capillarity member 15 comprises a plurality of thin tubes, porous material, or similar materials and/or geometrical shapes for creating a capillarity effect. Thus, the capillarity member may comprise a bundle of thin tubes having inherent capillary effect and may be surrounded by an outer tube protecting the capillarity member 15 from the high internal pressure, so that the capillary function is not deteriorated.

The water collecting container of FIG. 2 comprises a water absorbing material 16 which absorbs the water from the capillarity member 15 and thus assists the capillarity member in extracting the water from the fuel cell. The water absorbing material 16 comprises Silicon dioxide or similar materials. In FIG. 2, the water collecting container 14 is arranged adjacent to the device housing 12 but may also be arranged in the device housing 12.

In FIG. 3, the water collecting container 14 is the device housing 12, and the water absorbing material 16 is arranged in the device housing 12 surrounding both the containers and the fuel cell 4. The power consuming device 2 is a wireless driving unit running back and forth in a lower part of the well in one lateral 30 and then further into another lateral 30, as shown in FIG. 4. Thus, the wireless driving unit can operate in the lower part of the well for years without having to surface.

The downhole power supply device 1 may further comprise a control unit 17 for controlling the supply of fuel and/or an oxidising agent to the fuel cell 4 via electrical lines, e.g. the control unit controls valves 31 arranged in the fuel inlet 5 and the oxidising inlet 6, as shown in FIG. 2.

Once the valves are activated, the fuel cell is activated, and when the valves 31 are closed again, the fuel cell will stop producing electricity. The fuel cell can thus be turned on or off upon request without having to undergo a longer start-up procedure which is not possible when the downhole power supply device is arranged in parts of the well which are unreachable by electrical lines or by a wireline. The control unit may be pre-programmed with an activation plan, e.g. if the downhole power supply device 1 is arranged outside the well tubular metal structure 20, or the control unit may receive signals in the form of pulsed waves down the well fluid to activate or deactivate the fuel cell. The control unit 17 may thus comprise a timer for activating the fuel cell at certain time intervals.

As shown in FIG. 5, the downhole power supply device 1 further comprises a temperature sensor 18 for measuring a temperature exterior of the downhole power supply device and/or interior of the downhole power supply device 1. If the temperature increases to approximately the boiling point of the water, a pressure generating unit 19 is configured to increase the internal pressure, so that the boiling point of the water is equally increased to prohibit the water from boiling. The fuel container 9 comprises a plurality of metal hydrates for binding the fuel and thereby ensuring a controlled fuel cell operation.

FIG. 4 shows a downhole system 100 comprising the well tubular metal structure 20 arranged in a borehole 21 and having an exterior face 22 and an inside 23. The downhole power supply device 1 is arranged inside the power consuming device 2, which is a tool 24, such as a downhole driving unit. The downhole driving unit may be a downhole tractor as shown in FIG. 3 having wheels 41 on arms 42. The downhole power supply device 1 is thus arranged inside the well tubular metal structure 20. In FIGS. 5 and 6, the downhole power supply device 1 is arranged on the exterior face 22 of the well tubular metal structure 20. In FIG. 6, the power consuming devices 2 are sensors 45 arranged in production zones 101. The production zones 101 are provided by annular barriers 50 which are expanded to isolate the production zone. The annular barrier may also serve another purpose, e.g. as a liner hanger between an upper casing 32 and the well tubular metal structure 20. The well tubular metal structure 20 comprises openings 44 opposite the production zone 101 for allowing fluid to flow from fractures 36B in the production zone into the well tubular metal structure 20. The openings may be provided with inflow control valves 46.

The tool comprising the downhole power supply device 1 may be connected to a slickline, which is not an electrical line and which is always present near a well, as the slickline is a cheaper line which does not take up at lot of space. The tool may also be connected to an optic fibre for communication of data to a surface of the borehole while being powered by the downhole power supply device 1. Long wirelines have an electric resistance which is so high that the tool in the end of the wireline does not receive enough power to perform an intended operation, and thus the tool comprises the downhole power supply device as a secondary power supply to the tool in order to compensate for lack of power supply through the wireline.

As shown in FIG. 6, the power consuming device is a sensor 45 as well as an actuator 26 arranged on the exterior face of the well tubular metal structure 20. The actuator 26 slides a sliding sleeve 25 to open or close the openings 44.

In FIG. 7, the downhole power supply device 1 further comprises a regenerative unit 33 for converting water from the fuel cell 4 into fuel and into an oxidising agent and thus recharging the fuel cell by supplying the fuel container with fuel and supplying the oxidising agent container with the oxidising agent. The regenerative unit 33 comprises a regenerative fuel cell 34 configured to convert water from the water collecting container into fuel and into an oxidising agent. The regenerative unit 33 thus has a first inlet 35 fluidly connected with the water collecting container, a first outlet 36 fluidly connected with the fuel container, and a second outlet 37 fluidly connected with the oxidising agent container 10. The regenerative unit 33 further comprises an energy harvesting unit 38 for harvesting energy from a unit (not shown) which is arranged inside the well tubular metal structure 20 and which generates energy through the well tubular metal structure 20 to energise the energy harvesting unit 38 and thus energise the regenerative fuel cell 34 to convert water into fuel and into an oxidising agent.

In FIG. 8, the downhole power supply device 1 further comprising a power coupling 27, such as an electric connection, an electric transducer, an inductive coil or an acoustic transducer for receiving power from an external device e.g. in the well tubular metal structure or if the downhole power supply device is part of a tool in the well tubular metal structure from another unit submerged into the well tubular metal structure. The tool may also comprise a wet connector, such as a wet stab connector, for receiving power or for being connectable to a wireline. The power coupling 27 may also be arranged on the exterior face of the well tubular metal structure and thus not be penetrating the well tubular metal structure.

In FIG. 9, the downhole power supply device 1 further comprises a regenerative unit 33 being an electrolysis unit 39 having an electrolysis chamber 40 decomposing water into oxygen and hydrogen gas due to an electric current being passed through the water. The power coupling is connected to the regenerative unit 33, e.g. the electrolysis unit, for supplying the received power to the regenerative unit.

The fuel cell of the downhole power supply device may be a polybenzimidazole fuel cell. The fuel cell may thus have a membrane comprising phosphoric acid (PA)-doped polybenzimidazole (PBI). When the fuel cell has a membrane comprising phosphoric acid (PA)-doped polybenzimidazole (PBI), the membrane of the fuel cell exhibits high ionic conductivity at temperatures above 150° C., low gas permeability, excellent oxidative and thermal stability, and nearly zero water drag coefficient. The fuel cell is operable without external power for a period of more than 500 hours, preferably more than 750 hours and even more preferably more than 1000 hours.

The membrane of the fuel cell may be prepared by either imbibing the polybenzimidazole (PBI) membranes cast from dimethyl acetamide (DMAc) organic solvent with phosphoric acid (PA) or casting directly from a solution of polybenzimidazole (PBI) dissolved in a mixed acid solvent such as trifluoroacetic acid (TFA) and phosphoric acid (PA).

The fuel cell may have a high-temperature polymer electrolyte membrane operating at a temperature above 150° C.

The fuel cell operates without humidification, such as without e.g. gas humidification. Operation of polymer membrane fuel cells at temperatures higher than 120° C. without any external humidification is highly desired since fuel cell systems operating at higher temperature will be simplified dramatically. Above 150° C., the power output at ambient pressure may reach more than 0.8 W/cm² at a current density above 1.4 A/cm².

Furthermore, the fuel cell may be a non-flow-through fuel cell. By having a non-flow-through fuel cell, the downhole power supply device can have a very simple design and the downhole power supply device is very reliable while providing a passive maintenance of maximum power delivered by the fuel cell. Thus, there is no need to control the fuel cell by having a maximum power limit. Furthermore, by having a non-flow-through fuel cell, there is no need for a pump in order to make the system operate.

The fuel may be hydrogen and the oxidising agent may be oxygen which in the fuel cell 4 undergoes the following chemical reaction:

Anode Reaction: $2H_2 + 2O_2 \rightarrow 2H_2O + 4e-$

Cathode Reaction: $O_2 + 4e- \rightarrow 2O_2-$

Overall Cell Reaction: $2H_2 + O_2 \rightarrow 2H_2O$

In the regenerative fuel cell 34, the water is converted into hydrogen and oxygen by the chemical reaction:

At cathode: $H_2O + 2e- \rightarrow H_2 + O_2-$

At anode: $O_2- \rightarrow 1/2 O_2 + 2e-$

Overall: $H_2O \rightarrow 1/2 O_2 + H_2$

The well tubular metal structure 20 of FIGS. 4 and 6 comprises annular barriers 50. Each annular barrier comprises a tubular metal part 51 for mounting as part of the well tubular metal structure. The tubular metal part 51 has a first expansion opening 52 and an outer face 53, and an expandable metal sleeve 54 is arranged surrounding the tubular metal part and having an inner face 55 facing the tubular metal part 51 and an outer face 56 facing a wall 57 of the borehole. Each end 58 of the expandable metal sleeve 54 is connected with the tubular metal part, defining an annular space 59 between the inner face of the expandable metal sleeve 54 and the tubular metal part 51. The expandable metal sleeve is configured to expand by entering pressurised fluid into the annular space through the first expansion opening.

By fluid or well fluid is meant any kind of fluid that may be present in oil or gas wells downhole, such as natural gas, oil, oil mud, crude oil, water, etc. By gas is meant any kind of gas composition present in a well, completion, or open hole, and by oil is meant any kind of oil composition, such as crude oil, an oil-containing fluid, etc. Gas, oil, and water fluids may thus all comprise other elements or substances than gas, oil, and/or water, respectively.

By a casing is meant any kind of pipe, tubing, tubular, liner, string etc. used downhole in relation to oil or natural gas production.

In the event that the tool is not submergible all the way into the casing, a downhole tractor can be used to push the tool all the way into position in the well. The downhole tractor may have projectable arms having wheels, wherein the wheels contact the inner surface of the casing for propelling the tractor and the tool forward in the casing. A downhole tractor is any kind of driving tool capable of pushing or pulling tools in a well downhole, such as a Well Tractor®.

Although the invention has been described in the above in connection with preferred embodiments of the invention, it will be evident for a person skilled in the art that several modifications are conceivable without departing from the invention as defined by the following claims.

The invention claimed is:

1. A downhole power supply device for supplying power in situ to a power consuming device arranged in a well, comprising:
   a fuel cell producing electricity and water and having a fuel inlet, an oxidising inlet, an electric output and a water outlet,
   a fuel container fluidly connected to the fuel inlet, and
   an oxidising agent container fluidly connected to the oxidising inlet,
   wherein the fuel cell has an internal pressure which is at least 1.0 bar for increasing a boiling temperature of the water produced in the fuel cell,
   wherein the water outlet is fluidly connected to a water collecting container via a wick that is configured to suck the water from the fuel cell into the water collecting container, wherein the wick is configured to allow the fuel cell to be rotationally independent.

2. A downhole power supply device according to claim 1, wherein the fuel cell is a polybenzimidazole fuel cell.

3. A downhole power supply device according to claim 1, wherein the fuel cell has a membrane comprising phosphoric acid (PA)-doped polybenzimidazole (PBI).

4. A downhole power supply device according to claim 1, wherein the fuel cell has a high-temperature polymer electrolyte membrane.

5. A downhole power supply device according to claim 1, wherein the fuel cell is operable without external power for a period of more than 500 hours.

6. A downhole power supply device according to claim 1, wherein the fuel cell is configured to operate without humidification.

7. A downhole power supply device according to claim 1, wherein the water collecting container comprises a water absorbing material.

8. A downhole power supply device according to claim 7, wherein the water absorbing material comprises Silicon dioxide or similar materials.

9. A downhole power supply device according to claim 1, further comprising a power coupling for receiving power.

10. A downhole power supply device according to claim 1, further comprising a regenerative unit being an electrolysis unit having an electrolysis chamber.

11. A downhole power supply device according to claim 1, further comprising a control unit, such as a timer for activating the fuel cell at certain time intervals.

12. A downhole power supply device according to claim 1, further comprising a regenerative unit comprising:
   a regenerative fuel cell for converting water from the fuel cell into fuel and into an oxidising agent,
   a first inlet fluidly connected with the water collecting container,
   a first outlet fluidly connected with the fuel container, and
   a second outlet fluidly connected with the oxidising agent container.

13. A downhole power supply device according to claim 1, further comprising a pressure generating unit configured to increase the internal pressure.

14. A downhole system comprising:
   a well tubular metal structure arranged in a borehole and having an exterior face and an inside,
   a power consuming device, and
   a downhole power supply device according to claim 1, arranged inside the well tubular metal structure or arranged on the exterior face of the well tubular metal structure.

15. A downhole system according to claim 14, wherein the power consuming device is a tool arranged in the well tubular metal structure and the downhole power supply device is comprised in the tool.

16. A downhole system according to claim 14, wherein the power consuming device is a sensor or an actuator, being arranged exterior of the well tubular metal structure.

17. A downhole system according to claim 16, wherein the downhole power supply device and the power consuming device are arranged exterior of the well tubular metal structure.

18. A downhole system according to claim 14, wherein the power supply device is located on the exterior face of the well tubular metal structure.

19. A downhole power supply device according to claim 1, wherein the fuel cell is contained within a housing, and the water collecting chamber is positioned outside the housing.

20. A downhole power supply device according to claim 1, where the wick includes a bundle of tubes surrounded by an outer tube.

* * * * *